(12) United States Patent
Steel et al.

(10) Patent No.: US 11,965,411 B2
(45) Date of Patent: Apr. 23, 2024

(54) SYSTEMS AND METHODS FOR ANALYZING CASING BONDING IN A WELL USING ULTRASOUND VELOCITY FILTERING

(71) Applicants: Pipelines 2 Data (P2D) Limited, Aberdeen (GB); ConocoPhillips Company, Houston, TX (US)

(72) Inventors: Geoff Steel, Aberdeen (GB); Mark Walsh, Aberdeen (GB); Stephen John Mayo, Aberdeen (GB)

(73) Assignees: CONOCOPHILLIPS COMPANY, Houston, TX (US); PIPELINES 2 DATA (P2D) LIMITED, Aberdeen (GB)

(*) Notice: Subject to any disclaimer, the term of this patent is extended or adjusted under 35 U.S.C. 154(b) by 230 days.

(21) Appl. No.: 17/080,763

(22) Filed: Oct. 26, 2020

(65) Prior Publication Data
US 2021/0124072 A1 Apr. 29, 2021

Related U.S. Application Data

(60) Provisional application No. 63/094,258, filed on Oct. 20, 2020, provisional application No. 63/032,240, (Continued)

(51) Int. Cl.
*E21B 47/005* (2012.01)
*E21B 47/085* (2012.01)
(Continued)

(52) U.S. Cl.
CPC .......... *E21B 47/005* (2020.05); *E21B 47/085* (2020.05); *E21B 47/095* (2020.05);
(Continued)

(58) Field of Classification Search
None
See application file for complete search history.

(56) References Cited

U.S. PATENT DOCUMENTS 4,658,383 A * 4/1987 Zimmer ................. G01V 1/245
367/75
4,992,994 A 2/1991 Rambow et al.
(Continued)

FOREIGN PATENT DOCUMENTS

CA          3063567 A1    6/2020
WO    WO-2017210231 A1   12/2017
(Continued)

OTHER PUBLICATIONS

International Search Report and Written Opinion for International Application No. PCT/US2020/057334 dated Feb. 5, 2021, 8 pages.
(Continued)

*Primary Examiner* — Curtis A Kuntz
*Assistant Examiner* — Jerold B Murphy
(74) *Attorney, Agent, or Firm* — Polsinelli PC (57) ABSTRACT

Implementations described and claimed herein provide systems and methods for isolation detection. In one implementation, an axial acoustic signal is obtained. The axial acoustic signal is captured using an axial sensor deployed in a structure in a subterranean surface. The axial acoustic signal is separated into a first wave region and a second wave region by applying velocity filtering. An axial symmetry of a portion of the structure is determined based on at least one of the first wave region or the second wave region.

20 Claims, 11 Drawing Sheets

Related U.S. Application Data filed on May 29, 2020, provisional application No. 62/926,228, filed on Oct. 25, 2019, provisional application No. 62/926,243, filed on Oct. 25, 2019.

(51) Int. Cl.
| | |
|---|---|
| *E21B 47/095* | (2012.01) |
| *G01V 1/28* | (2006.01) |
| *G01V 1/30* | (2006.01) |
| *G01V 1/40* | (2006.01) |
| *G01V 1/48* | (2006.01) |
| *G01V 1/50* | (2006.01) |

(52) U.S. Cl.
CPC ............ *G01V 1/284* (2013.01); *G01V 1/306* (2013.01); *G01V 1/40* (2013.01); *E21B 2200/22* (2020.05)

(56) References Cited

U.S. PATENT DOCUMENTS

| | | |
|---|---|---|
| 6,941,819 B1 | 9/2005 | Maki, Jr. et al. |
| 9,494,705 B2 | 11/2016 | Sinha |
| 10,222,501 B2 | 3/2019 | Zhang et al. |
| 10,465,509 B2 | 11/2019 | Yao et al. |
| 11,542,810 B2 | 1/2023 | Hallundbæk et al. |
| 2003/0151975 A1 | 8/2003 | Zhou et al. |
| 2004/0001389 A1 | 1/2004 | Tang |
| 2004/0216873 A1 | 11/2004 | Frost et al. |
| 2005/0205248 A1 | 9/2005 | Barolak et al. |
| 2006/0119364 A1 | 6/2006 | Chen et al. |
| 2010/0038079 A1 | 2/2010 | Greenaway |
| 2010/0154531 A1 | 6/2010 | Han et al. |
| 2010/0263449 A1 | 10/2010 | Bolshakov et al. |
| 2011/0188347 A1* | 8/2011 | Thiercelin ................ G01V 1/42 367/69 |
| 2011/0255370 A1* | 10/2011 | Hirabayashi ............. G01V 1/42 367/43 |
| 2013/0098604 A1 | 4/2013 | Ramakrishnan et al. |
| 2014/0177389 A1 | 6/2014 | Bolshakov et al. |
| 2015/0198732 A1 | 7/2015 | Zeroug et al. |
| 2015/0285607 A1 | 10/2015 | Helmore |
| 2016/0109614 A1 | 4/2016 | Wu et al. |
| 2016/0299050 A1 | 10/2016 | Dorovsky et al. |
| 2017/0016305 A1 | 1/2017 | Prieur et al. |
| 2017/0114626 A1 | 4/2017 | Bardapurkar et al. |
| 2018/0003032 A1 | 1/2018 | Donzier et al. |
| 2018/0003843 A1 | 1/2018 | Hori et al. |
| 2018/0031723 A1 | 2/2018 | Przebindowska et al. |
| 2018/0073353 A1 | 3/2018 | Malik et al. |
| 2018/0100950 A1 | 4/2018 | Yao et al. |
| 2018/0149019 A1 | 5/2018 | Bose et al. |
| 2018/0196157 A1* | 7/2018 | Zeroug .................... G01V 1/46 |
| 2019/0101663 A1 | 4/2019 | Walters et al. |
| 2019/0226319 A1 | 7/2019 | Espe et al. |
| 2020/0049850 A1* | 2/2020 | Liu .......................... G01V 1/44 |
| 2020/0072996 A1 | 3/2020 | Zhao et al. |
| 2020/0190974 A1 | 6/2020 | Manders |
| 2021/0017854 A1 | 1/2021 | Fang |
| 2021/0054728 A1 | 2/2021 | Fellinghaug et al. |
| 2021/0364477 A1 | 11/2021 | Shoji et al. |

FOREIGN PATENT DOCUMENTS

| | | |
|---|---|---|
| WO | WO-2018176024 A1 | 9/2018 |
| WO | WO-2018183246 A1 | 10/2018 |
| WO | WO-2019118189 A1 | 6/2019 |

OTHER PUBLICATIONS

International Search Report and Written Opinion for International Application No. PCT/US2020/057344 dated Jan. 26, 2021, 14 pages.
International Search Report and Written Opinion for International Application No. PCT/US2020/057415 dated Jan. 27, 2021, 8 pages.
International Search Report and Written Opinion for International Application No. PCT/US2020/057418 dated Jan. 26, 2021, 11 pages.
Oct. 17, 2022—U.S. Final Office Action—U.S. Appl. No. 17/080,155, 32 Pages.
Feb. 15, 2023—U.S. Non-Final Office Action—U.S. Appl. No. 17/080,761, 6 Pages.
Apr. 6, 2023—U.S. Final Office Action—U.S. Appl. No. 17/080,763, 30 Pages.
Feb. 3, 2023—U.S. Non-Final Office Action—U.S. Appl. No. 17/080,216, 10 Pages.
Mar. 17, 2023—U.S. Non-Final Office Action—U.S. Appl. No. 17/080,155, 44 Pages.
Aug. 16, 2023—U.S. Notice of Allowance—U.S. Appl. No. 17/080,216, 12 Pages.
Aug. 25, 2023—U.S. Notice of Allowance—U.S. Appl. No. 17/080,761, 11 Pages.
Sep. 26, 2023—U.S. Final Office Action—U.S. Appl. No. 17/080,155, 52 Pages.
Extended European Search Report for Application No. 20878482.7 dated Oct. 17, 2023 (12 pages).
Supplementary European Search Report for Application No. EP 20 87 9562 dated Nov. 7, 2023 (8 pages).
Dec. 11, 2023—U.S. Notice of Allowance—U.S. Appl. No. 17/080,216, 8 Pages.

\* cited by examiner

SYSTEMS AND METHODS FOR ANALYZING CASING BONDING IN A WELL USING ULTRASOUND VELOCITY FILTERING

CROSS-REFERENCE TO RELATED APPLICATIONS

The present application claims priority to U.S. Provisional Application No. 63/094,258 filed Oct. 20, 2020 and U.S. Provisional Application No. 62/926,243 filed Oct. 25, 2019 and U.S. Provisional Application No. 62/926,228 filed Oct. 25, 2019 and U.S. Provisional Application No. 63/032,240 filed May 29, 2020. Each of these applications is incorporated by reference in its entirety herein.

BACKGROUND

I. Field

Aspects of the present disclosure relate generally to systems and methods for analyzing subterranean cylindrical structures using acoustic sensing and more particularly to identifying isolation in connection with wellbore plug and abandon techniques.

II. Discussion of Related Art

Production of hydrocarbons involves forming one or more wells in a subterranean formation. Generally, in connection with formation of a well, a wellbore is drilled and a casing is passed down the wellbore. The casing often includes sections with differing diameters, eccentricities, and/or bonding with surrounding material. In some regions, there may be concentric casing. In many instances, a casing or outer casing forms an annular space with surrounding rock. The annular space is commonly filled with cement or a similar material over at least part of its length when the well is created. Production tubing is passed through the casing, and the hydrocarbons are produced through the production tubing. In this context, the casing supports the wellbore and prevents collapse of the well.

Wellbores may be plugged and abandoned at the end of the wellbore useful life to prevent environmental contamination, among other benefits. At the end of the useful life, a wellbore commonly includes cemented casing with the production tube passed down the casing. In connection with plug and abandon, an effective seal is created across a full diameter of the wellbore. Conventionally, production tubing is removed and casing is milled away, along with cement exterior to the casing, before setting a continuous new cement plug across the full diameter of the wellbore, from rock to rock. Alternatively, the casing can be left in place, provided that the quality of original cement and cement bond to the exterior of the casing are confirmed. If the cement and cement bond to the exterior of the casing is adequate, a new cement plug can be set inside the casing, thereby effectively creating a barrier across the full diameter of the wellbore.

Thousands of meters of production tubing are typically removed to identify isolation corresponding to regions of cement having seal integrity suitable for plug and abandon. Stated differently, identifying one or more locations of isolation provided by exterior cement during plug and abandon activities conventionally involves removal of internal completion to permit logging tools free access to casings. Through-tubing plug and abandonment may theoretically be performed without removing the production tubing, saving considerable expense. The tubing may simply be cut or perforated and cement passed down the tubing and back up the annulus between tubing and casing to form a plug across the full casing diameter. However, this would involve assessment of the cement bond with casing from a location within the production tubing, and conventional techniques are unable to detect an integrity of a cement bond with a casing through the production tubing, casing, and any material, such as water, air, and/or gas. Isolation detection is thus time and resource extensive. It is with these observations in mind, among others, that various aspects of the present disclosure were conceived and developed.

SUMMARY

Implementations described and claimed herein address the foregoing problems by providing systems and methods for characterizing a subterranean structure. In one implementation, an axial acoustic signal is obtained. The axial acoustic signal is captured using an axial sensor deployed in a structure in a subterranean surface. The axial acoustic signal is separated into a first wave region and a second wave region by applying velocity filtering. An axial symmetry of a portion of the structure is determined based on at least one of the first wave region or the second wave region.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for analyzing a structure, such as a cylindrical structure and/or a subterranean structure, using acoustic waves. In one aspect, an acoustic logging tool of an isolation detection system having one or more acoustic sensors is deployed in a production tube to detect cement integrity around a casing in a downhole environment of a wellbore. The one or more acoustic sensors may include an axial sensor and/or a radial sensor. The acoustic logging tool can include two or more independent acoustic sensors working in orthogonal directions. At least one of the two or more independent acoustic sensors is operably arranged to measure axially along a length of the wellbore, and at least one of the two or more independent acoustic sensors is operably arranged to measure radially along the wellbore. Acoustic logging data captured by the independent acoustic sensors may be used to determine a presence of cement within an isolation region and axial and radial symmetry of the cement, from which anomalies may be identified. The acoustic sensors provide isolation detection through both the production tube and the casing, without removal of internal completion, thereby reducing the time and resources expended for plug and abandon operations, among other advantages.

I. Terminology

In the description, phraseology and terminology are employed for the purpose of description and should not be regarded as limiting. For example, the use of a singular term, such as "a", is not intended as limiting of the number of items. Also, the use of relational terms are used in the description for clarity in specific reference to the figure and are not intended to limit the scope of the present inventive concept or the appended claims. Further, any one of the features of the present inventive concept may be used separately or in combination with any other feature. For example, references to the term "implementation" means that the feature or features being referred to are included in at least one aspect of the presently disclosed technology. Separate references to the term "implementation" in this description do not necessarily refer to the same implementation and are also not mutually exclusive unless so stated and/or except as will be readily apparent to those skilled in the art from the description. For example, a feature, structure, process, step, action, or the like described in one implementation may also be included in other implementations, but is not necessarily included. Thus, the presently disclosed technology may include a variety of combinations and/or integrations of the implementations described herein. Additionally, all aspects of the presently disclosed technology as described herein are not essential for its practice.

Lastly, the terms "or" and "and/or" as used herein are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture and Operations

Figure 1:
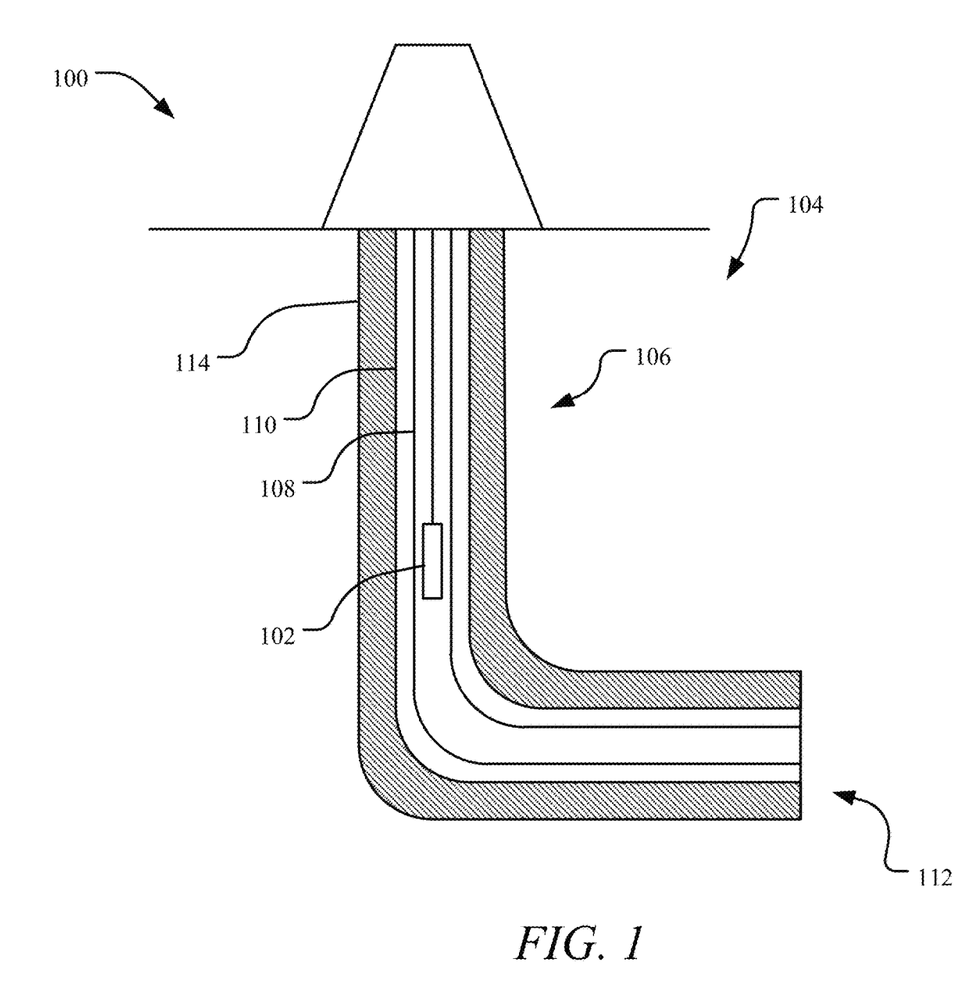
FIG. 1 shows an example isolation detection system for characterizing a subterranean structure.

To begin a detailed discussion of an example isolation detection system for characterizing a subterranean structure, reference is made to FIG. 1. In one implementation, an isolation detection system 100 including an acoustic logging tool 102 having one or more acoustic sensors is deployed into the subterranean structure. Examples of the various systems and methods described herein reference the subterranean structure including a production tube and casing in connection with isolation detection for plug and abandon operations. However, it will be appreciated by those skilled in the art that the presently disclosed technology is applicable to various types of structures, systems, and operations, including outside the oil and gas context. For example, the acoustic logging tool 102 may be used to determine a condition of pipes in connection with pigging operations in the oil and gas industry, the water industry, and/or the like. As another example, the acoustic logging tool 102 may be used in oil and gas applications to inspect structures deployed outside of downhole environments. Additionally, the acoustic logging tool 102 may be used to inspect fabricated pipes, storage tanks, and/or cylindrical structures to determine an integrity of structure containment and/or identify materials and connections outside and/or inside the structures.

Turning to FIG. 1, the acoustic logging tool 102 is received within a wellbore 106 formed in a subterranean formation 104. The wellbore 106 may involve a production tube 108 deployed in a casing 110. Cement 114 may fill an annulus 112 formed between the casing 110 and the formation 104, thus securing the casing 110 within the wellbore 106. The production tube 108 may be used in connection with the extraction of hydrocarbons from the formation 104. While FIG. 1 illustrates the wellbore 106 having a substantially vertical portion and a substantially horizontal portion, it will be appreciated that the acoustic logging tool 102 may be deployed within any wellbore arrangement having any number of vertical portions, horizontal portions, and/or any angle therebetween. Further, while FIG. 1 illustrates a land-based operation, it will be appreciated that the acoustic logging tool 102 may be utilized in land-based and/or sea-based operations.

In one implementation, the acoustic logging tool 102 is deployed within the production tube 106 to determine the continuity and/or symmetry of the cement 114 prior to plugging and abandoning the wellbore 106. The wellbore 106 can be plugged and abandoned following exhaustion and/or usefulness of the subterranean formation 104 for production of hydrocarbons. Successful plug and abandonment of the wellbore 106 involves a portion of the cement 114 having one or more isolation regions to prevent environmental contamination. As detailed herein, the isolation regions may be detected based on axial symmetry and radial symmetry. The acoustic logging tool 102 determines the axial and/or radial symmetry or asymmetry in the cement 114 through the production tube 108 and the casing 110, thereby allowing determination of an appropriate plug and abandonment location without removal of the production tube 108.

Figure 2:
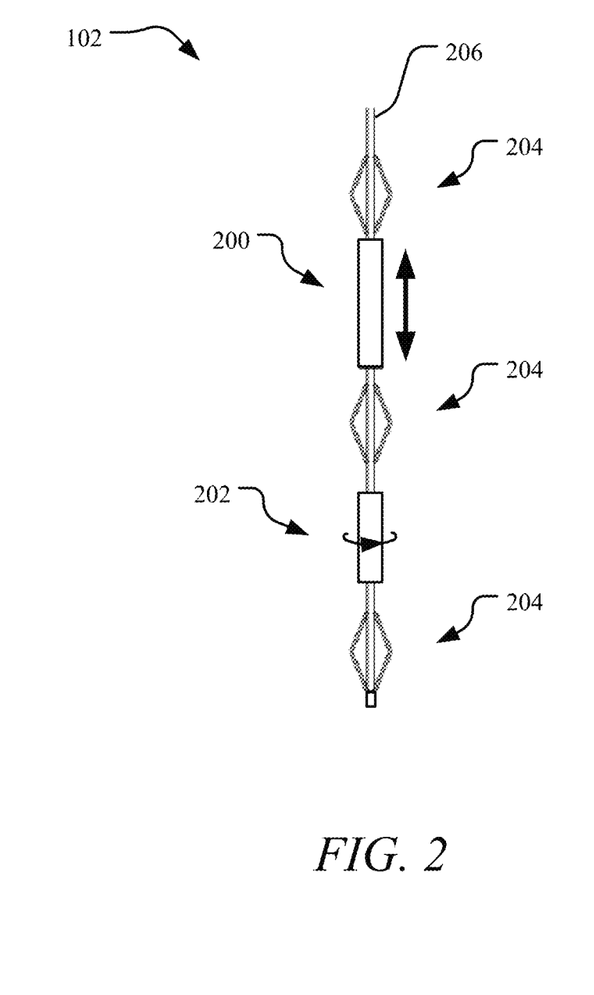
FIG. 2 illustrates an example acoustic logging tool of the isolation detection system.

As can be understood from FIG. 2, in one implementation, the acoustic logging tool 102 includes a radial sensor 202, an axial sensor 200, and one or more centralizers 204. The axial sensor 200 includes one or more axial acoustic transmitters and one or more axial acoustic receivers, and the radial sensor 202, which can rotate, includes one or more radial acoustic transmitters and one or more radial acoustic receivers. The centralizers 204 may be positioned above and below the acoustic sensors 200-202 to maintain the acoustic logging tool 102 in a centralized coaxial position inside a length of the production tubing 108, which is vertically oriented and located coaxially within a length of the casing 110. The casing 110 or an outer casing forms the annular space 112 with the surrounding subterranean formation 104 of the wellbore 106. The annular space 112 may be filled with the cement 114 or a similar material over at least part of its length when the well is created, and upon filling, the cement 114 is intended to bond with the casing 110 or outer casing to provide a seal.

In one implementation, the radial sensor 202 and the axial sensor 200 are independent sensors operating in orthogonal directions. The radial sensor 202 confirms a presence of radial symmetry in an isolation region, and the axial sensor 200 confirms a presence of axial symmetry in the isolation region. The axial sensor 200 scans in an axial direction along a length of the production tube 108, while the radial sensor 202 scans in a radial direction that is orthogonal to a general axis of the length of the production tube 108. As such, the axial sensor 200 detects changes in waves traveling along the casing 110 reflected from anomalies in the materials beyond the casing 110, as well as changes in the production tube 108 and casing collars, while the radial sensor 202 detects changes in waves travelling around the casing 110 reflected from anomalies in the materials beyond the casing 110. Thus, referring to FIG. 3, an axial log 300 is captured using the axial sensor 200 and a radial log 302 is captured using the radial sensor 202. In some implementations, each of the radial sensor 202 and the axial sensor 200 may capture both the axial log 300 and the radial log 302. The acoustic sensors 200-202, alone or together, provide an approximate measure of acoustic impedance 304 of the material surrounding the casing, which may be used in cement classification. Combining the axial log 300, the radial log 302, and the acoustic impedance 304, a characterization of isolation 306 may be generated. As shown in the characterization of isolation 306, isolation occurs when the axial log 300 includes an axial symmetry, the radial log 302 includes a radial symmetry, and the acoustic impedance 304 is high.

Generally, the axial sensor 200 senses short, thick features or anomalies on the casing 110, while the radial sensor 202 senses long, thin features or anomalies on the casing 110. The axial sensor 200 and the radial sensor 202, alone or in combination, may be used to determine whether material in contact with the casing 110 is cement or another material. Stated differently, both the radial sensor 202 and the axial sensor 200 may detect axial symmetry and radial symmetry and classify a material in contact with the casing 110 in terms acoustic impedance.

Figure 3:
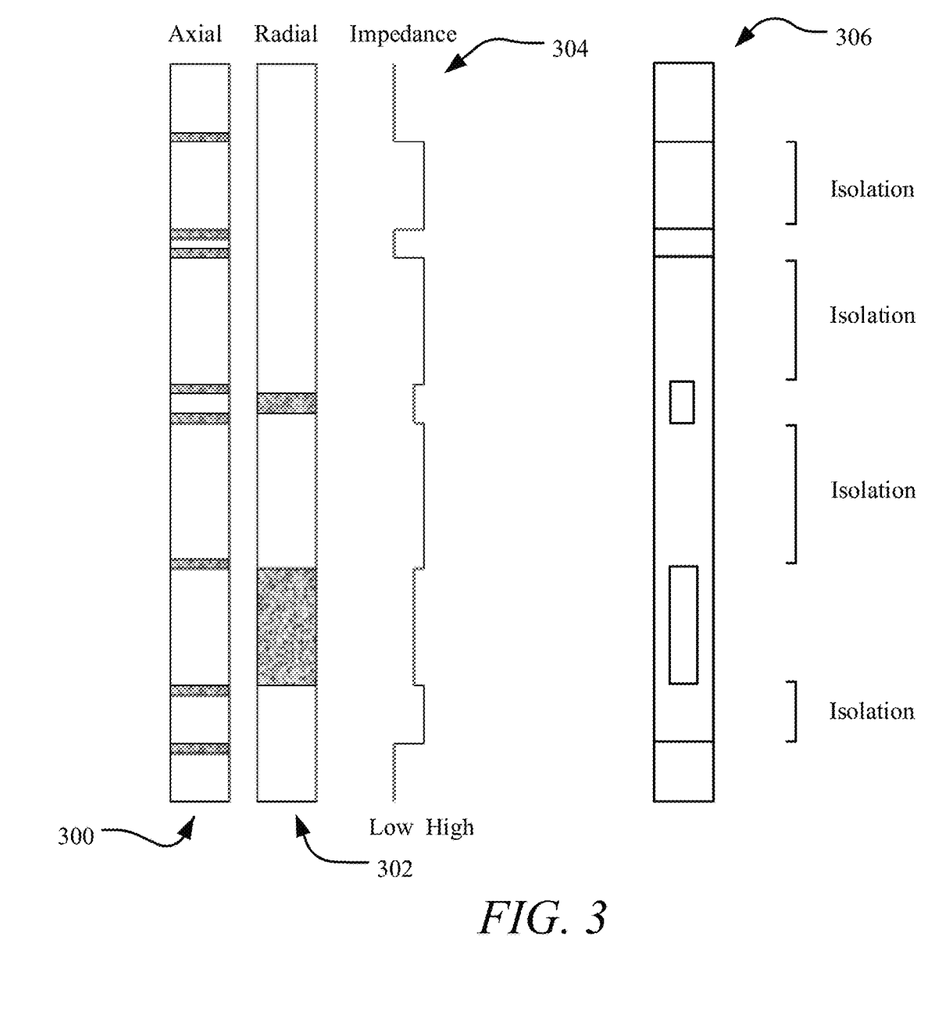
FIG. 3 depicts acoustic data captured using the acoustic logging tool and a characterization of isolation of the subterranean structure.

In one implementation, the acoustic logging tool 102 is deployed along the length of the production tube 108 as the radial sensor 202 and/or the axial sensor 200 scans. Using the axial log 300 acquired from the scans, a determination may be made regarding whether there is axial symmetry, such that the material in contact with the casing 110 is homogeneous. Similarly, using the radial log 302 acquired from the scans, a determination may be made regarding whether there is radial symmetry, such that the material in contact with the casing 110 is homogeneous in a radial plane. Thus, based on the axial symmetry and/or the radial symmetry, there is confirmation that for the length of travel of the acoustic logging tool 102 along the production tube 108 during the scan, the material in contact with the casing 110 is axially and/or radially the same. Accordingly, the material is free from anomalies, whether short and thick or long and thin, and isolation is present. In other words, the acoustic logging tool 102 senses whether the material surrounding the casing 110 is bonded with the casing 110 around an entirety of the casing 110. Additionally, the acoustic logging tool 102 may be used to identify the material surrounding the casing 110. For example, the material may be cement, a fluid, a gas, and/or the like.

In one example implementation, the acoustic logging tool 102 is deployed to evaluate isolation between the casing 110 and subterranean formation 104, such as bedrock, around a hole from inside the production tube 108. The acoustic logging tool 102 provides 360° of coverage sufficient to identify anomalies that are of approximately one inch of diameter or greater at the casing-cement/barrier interface. As described here, the acoustic logging tool 102 discriminates between a vertically continuous anomaly and a vertically discontinuous anomaly, as well as between different types of materials, such as liquid (gas, seawater, brine, water-based mud, oil-based mud, etc.) and solid (e.g., cement, creeping shale, salt, etc.). Additionally, the acoustic logging tool 100 is able to cope with variable tubing conditions, such as the presence of oil, scale, corrosion, and/or the like.

The acoustic logging tool 102 can dynamically calibrate in response to temperatures and/or pressures present within the wellbore 206 and downhole environment. The wellbore 106 and the downhole environment can have high temperatures and high pressures, which can individually and/or collectively change sensor performance within the acoustic logging tool 102. In one implementation, Aluminum Beryllium alloy (AlBeMet) can be implemented as a component supporting acoustic elements of the acoustic logging tool 102. AlBeMet can be characterized with a very high speed of sound, approximately 9,656 m/s. As the acoustic logging tool 102 is operated, the high speed of sound can allow a "pure" signal traveling through the axial sensor 200 to be received prior to a return signal. The "pure" signal response can thus allow regular dynamic (e.g. in-situ) calibration of the acoustic logging tool 102 operating in the wellbore 106 and downhole environment. Stated differently, calibration of a receiver array of the axial sensor 200 may drive system performance for axial sensing. In one implementation, to dynamically calibrate each receive element within the operating environment of the wellbore 106, each receiver element is supported via a central bar running through all acoustic elements. In choosing a material with a very high velocity (e.g., AlBeMet), a transmitted pulse arrives at each of the receive elements in turn (above and below the transmitter) before anything else. The received signals may be monitored in response to the calibration pulse and the respective channel gain values adjusted to deliver equal outputs.

The acoustic logging tool 102 is movable axially within the production tube 108. A computing device obtains data captured using the acoustic logging tool 102 and processes the recorded data. The acoustic logging tool 102 transmits and receives waves. The acoustic logging tool 102 may record the captured signal or transmit the signal to a surface computing device at the surface for recording. The recorded data may be communicated to the computing device from the acoustic logging tool 102 or via another computing device and/or data storage device using a wireless connection (e.g., for communication over a network) or a wired connection. In some implementations, the computing device may include a display, at least one power source, at least one processor, a signal generator, controls, and/or the like for controlling the acoustic logging tool 102, recording signal data, displaying signal data, and/or processing the signal data as described herein. The computing device may be present on-site or remote from the downhole environment of the wellbore 106. It will further be appreciated that the same or separate computing devices may be used to control the acoustic logging tool 102 in connection with capturing and recording signals and to process the captured signals.

Figure 4A:
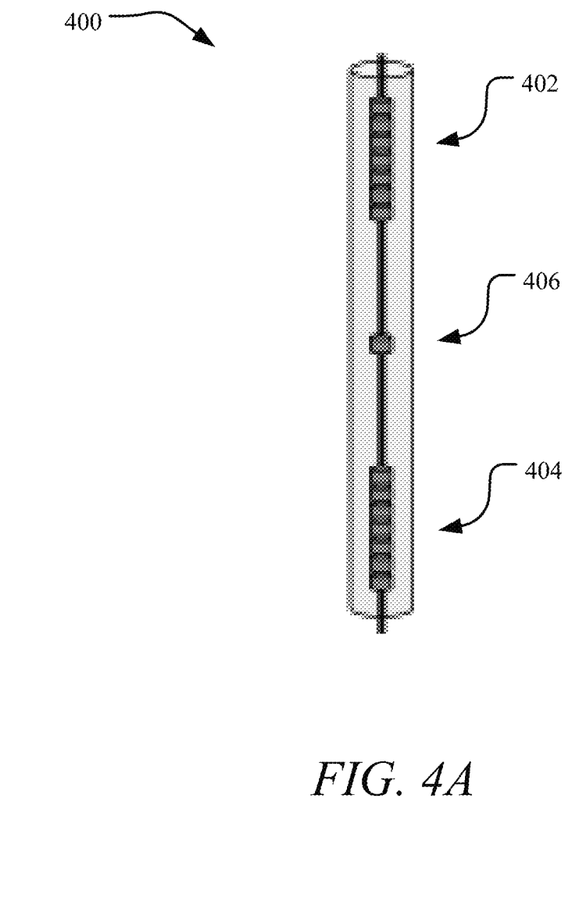
FIG. 4A shows an example axial sensor of the acoustic logging tool.
Figure 4B:
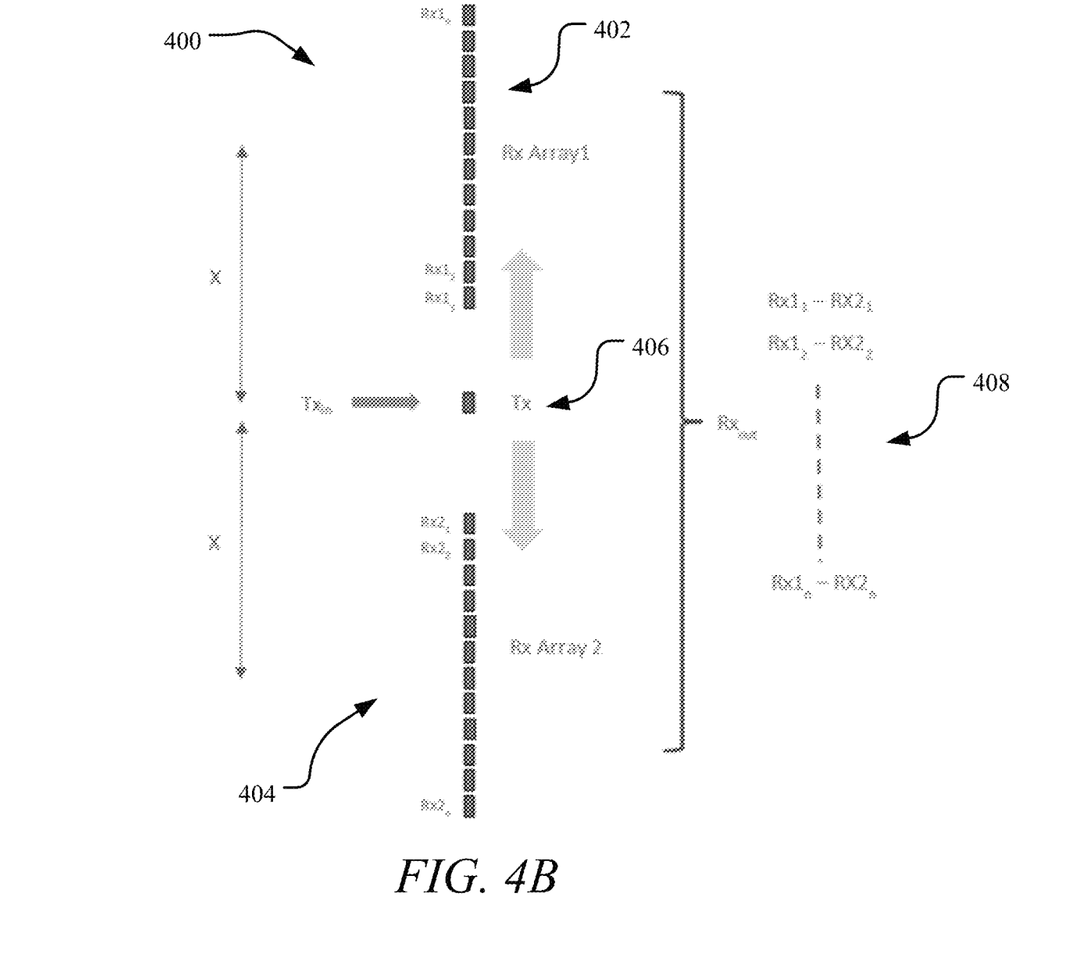
FIG. 4B illustrates an example axial sensor configuration of the axial sensor including a single element central transmitter and outboard receiver arrays.

Turning to FIGS. 4A-4B, an example axial sensor configuration 400 of the axial sensor 200 of the acoustic logging tool 102 is shown. In one implementation, the acoustic logging tool 102 implements velocity filtering in connection with the axial sensing of the axial sensor 200. As shown in FIGS. 4A-4B, in one implementation, the axial sensor configuration 400 includes a single element central transmitter with outboard receiver arrays. In one implementation, waves propagate out from the transmitter to the receiver arrays. The receiver arrays allow velocity filtering to select the desired propagation modes.

The axial sensor configuration 400 includes a first receiver array 402 and a second receiver array 404 positioned above and below a transmitter 406. The axial sensor configuration 400 may include a first spacing and a second spacing between the receiver arrays 402-404, respectively, and the transmitter 406. The spacing may be the same, such that the receiver arrays 402-404 are spaced equidistant.

The receiver arrays 402, 404 can increase a number of receiver channels, thereby allowing implementation of velocity filtering to separate two received waveforms (e.g. P waves and Rayleigh waves) complete with their respective information. P waves may be fast traveling, high penetration compression waves, and Rayleigh waves may be slow traveling, low penetration waves along an elliptical. Stated differently, the axial transmitter 406 generates an output 408 of acoustic waves with multiple propagation modes, which split up due to dispersion. Rayleigh waves and P waves are two propagation modes of interest that the velocity filtering may use separate the acoustic signal captured by the receiver arrays 402, 404.

The receiver arrays 402, 404 may be substantially identical, thus having a substantially equal number of receiver channels. In one implementation, each receiver array 402, 404 has seven (7) acoustic receivers providing seven receiver channels. In other implementations, the receiver arrays 402, 404 can have any number of acoustic receivers including, but not limited to, two, three, four, five, six, eight, ten, or twenty.

Figure 4C:
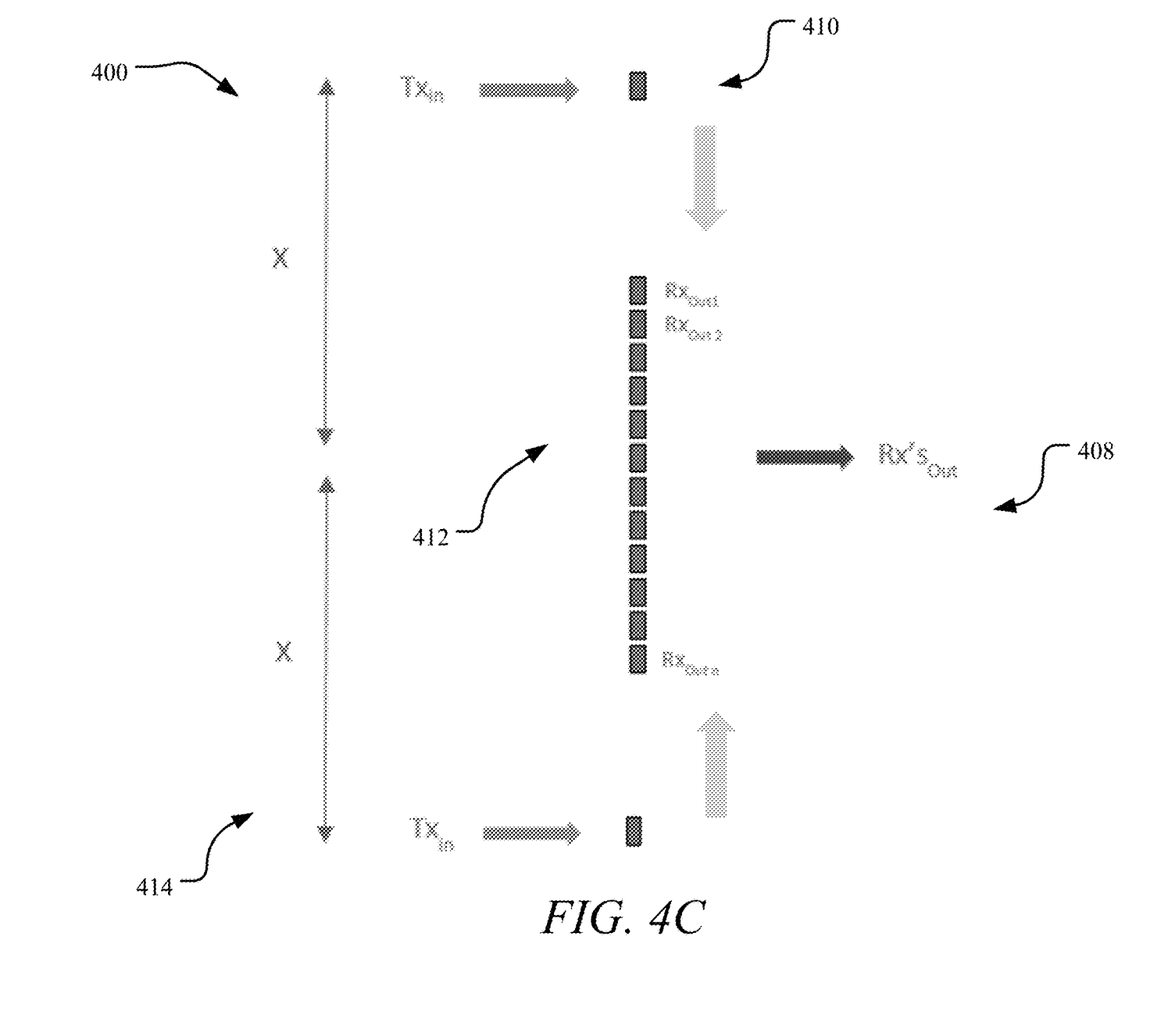
FIG. 4C shows another example axial sensor configuration having a central receiver array and single element outboard transmitters.

FIGS. 4A-4B illustrate an axial sensor configuration 400 having two receiver arrays 402, 404 disposed a substantially equidistance above and below the transmitter 406. Waves propagate out from the transmitter 406 to the receiver arrays 402,404. The receiver arrays 492, 404 allows velocity filtering to select the propagation modes of interest, such as Rayleigh waves and P waves. FIG. 4C illustrates single receiver array 412 with acoustic transmitters 410, 414 disposed substantially equidistance above and below the single acoustic sensor array 412. The single central receiver array 412 and the single element outboard transmitters 410, 414 include waves propagate from the transmitters 410, 414 inwards towards the receiver array 412 where they can be separated by a velocity filter to give their positive and negative velocities. Following the separation, the positive wave is subtracted from the negative wave to obtain a differential output (the output 408). The configuration 400 shown in FIG. 4C has the advantage of reducing the number of outputs (n receiver elements) so the electronics and data recording are simplified.

Figure 5A:
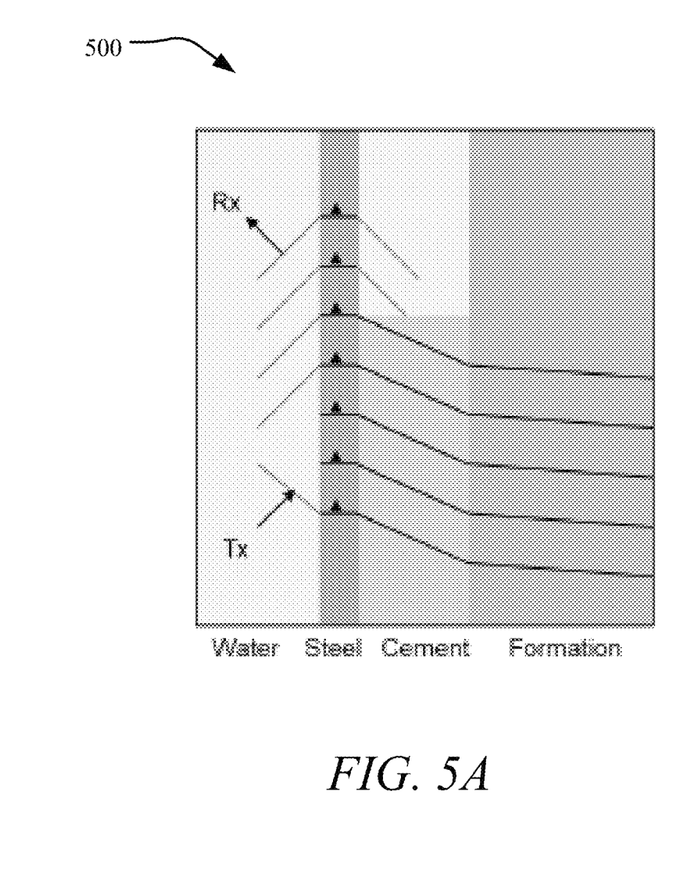
FIG. 5A illustrates example P waves within an example downhole environment.
Figure 5B:
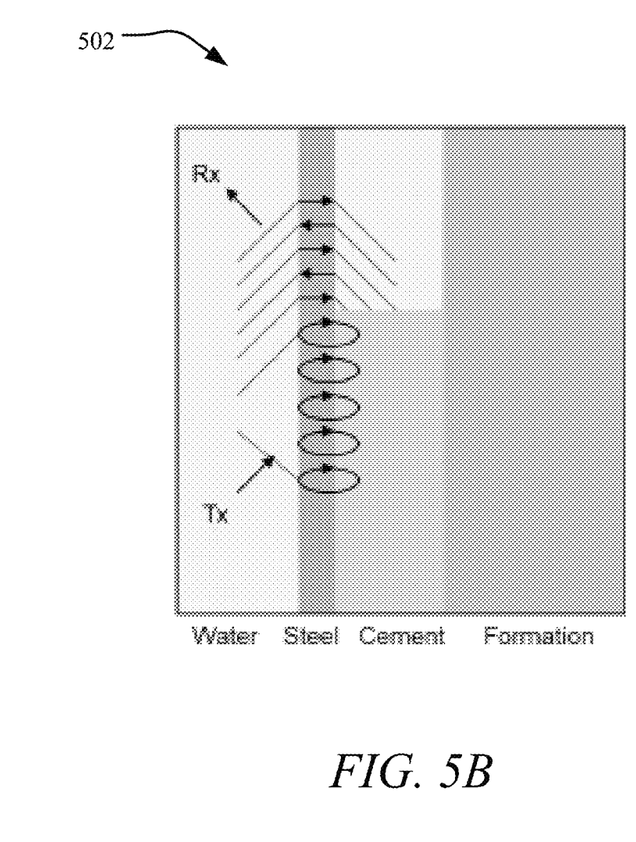
FIG. 5B shows example Rayleigh waves within an example downhole environment.

Referring to FIG. 5, a first diagram 500 corresponds to a first propagation mode and a second diagram 502 corresponds to a second propagation mode. In one example, the first propagation mode may be P waves or other fast waves, and the second propagation mode may be Rayleigh waves or other slow waves. The P waves may be fast traveling, high penetration compressional waves. The P waves pass through the casing 110 through the cement 114 and into the subterranean formation 104 before being received by a receiver of the axial sensor 200. The axial acoustic signal received by the receiver and a speed at which the axial acoustic signal is received may be used to determine what the P waves interacted with and/or traveled through (e.g., the casing 110, the cement 114, the formation 114, as well as any anomalies).

As can be appreciated in the example of the first diagram 500, the cement 114 is non-continuous along a length of the casing 110, thereby altering the P waves received by the receiver of the axial sensor 200. The P waves can be interrupted by the lack of cement 114 at an uphole portion of the wellbore 106, thereby preventing the P waves from reaching the subterranean formation 104 and altering the P waves travel path and/or travel time to the acoustic receiver of the axial sensor 200.

The Rayleigh waves may be slow traveling, low penetration surface waves generating elliptical motion. The Rayleigh waves pass through the casing 110 and into the cement 114 but are unable to pass through the cement 114 into the subterranean formation 104 before being received by an acoustic receiver of the axial sensor 200. The signal received by the acoustic receiver and speed at which the signal is received may be used to determine what the Rayleigh waves 504 interacted with and/or traveled through (e.g. the casing 110 and/or the cement 114).

As can be appreciated in the example of the second diagram 502, the cement 114 is non-continuous along a length of the casing 110, thereby altering the Rayleigh waves and their elliptical motion before being received by the acoustic receiver of the axial sensor 200. The Rayleigh waves can be the interrupted by the lack of cement 114 at an uphole portion of the wellbore 106, thereby altering the Rayleigh waves elliptical motion and travel path to the acoustic receiver of the axial sensor 200.

Figure 6:
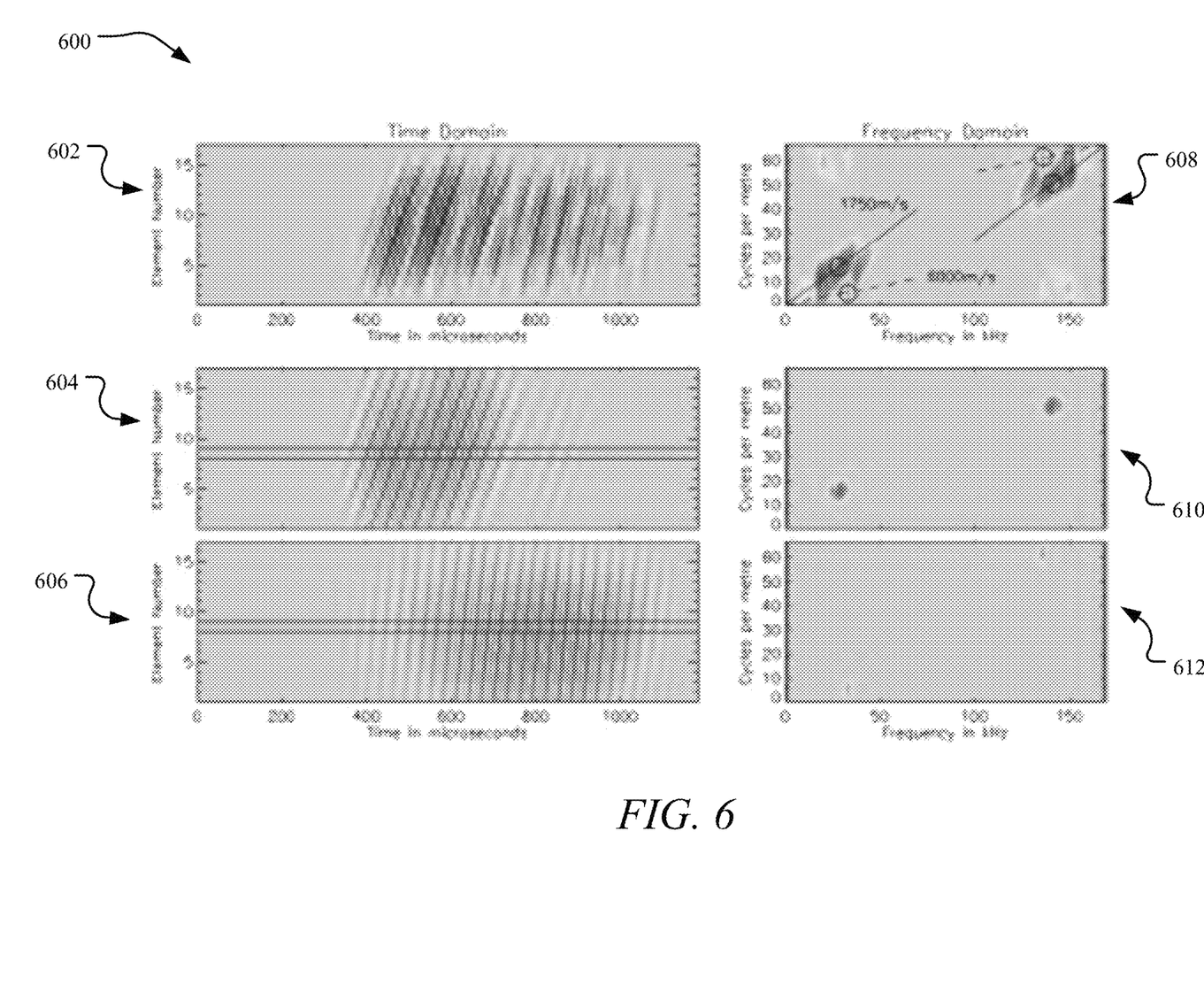
FIG. 6 illustrates differential outputs from the axial sensor.

Turning to FIG. 6, a diagrammatic representation 600 of a differential output from the acoustic receiver arrays of the axial sensor 200 is provided. In one implementation, the acoustic receiver arrays (e.g. acoustic receiver arrays 402, 404) can be paired with respect to their longitudinal distance from the acoustic transmitter 406. The receiver array pairs can thus generate a representation of the waves received over a predetermined period of time with respect to the respective acoustic array pair.

The acoustic receiver array(s) of the axial sensor 200 produce a differential output 602 from all element pairs of the axial sensor 200 in the time domain. The differential output 602 may be hanning weighted. Using velocity filtering, the differential output 602 may be separated into a first wave output 604 and a second wave output 606. The first wave output 604 may correspond to a first mode of propagation, such as slow waves (e.g., Rayleigh), and the second wave output 606 may correspond to a second mode of propagation, such fast waves (e.g., P waves), each with respect to acoustic receiver element. The differential output 602, as well as the first wave output 604 and the second wave output 606 may be multiplied by filters and converted from the time domain to the frequency domain. The velocity filtering can determine the output 608 in the frequency domain each of the first waves (e.g., Rayleigh or other slow waves) and the second waves (e.g., P waves or other fast waves) through determination of the velocity of each waveform. The output 608 in the frequency domain can be represented as cycles per meter (along a length of the wellbore 106) relative to frequency. Upon obtaining velocity for the respective waveforms, frequency plots 610, 612 can be generated for each of the first waves and the second waves, respectively.

Figure 7:
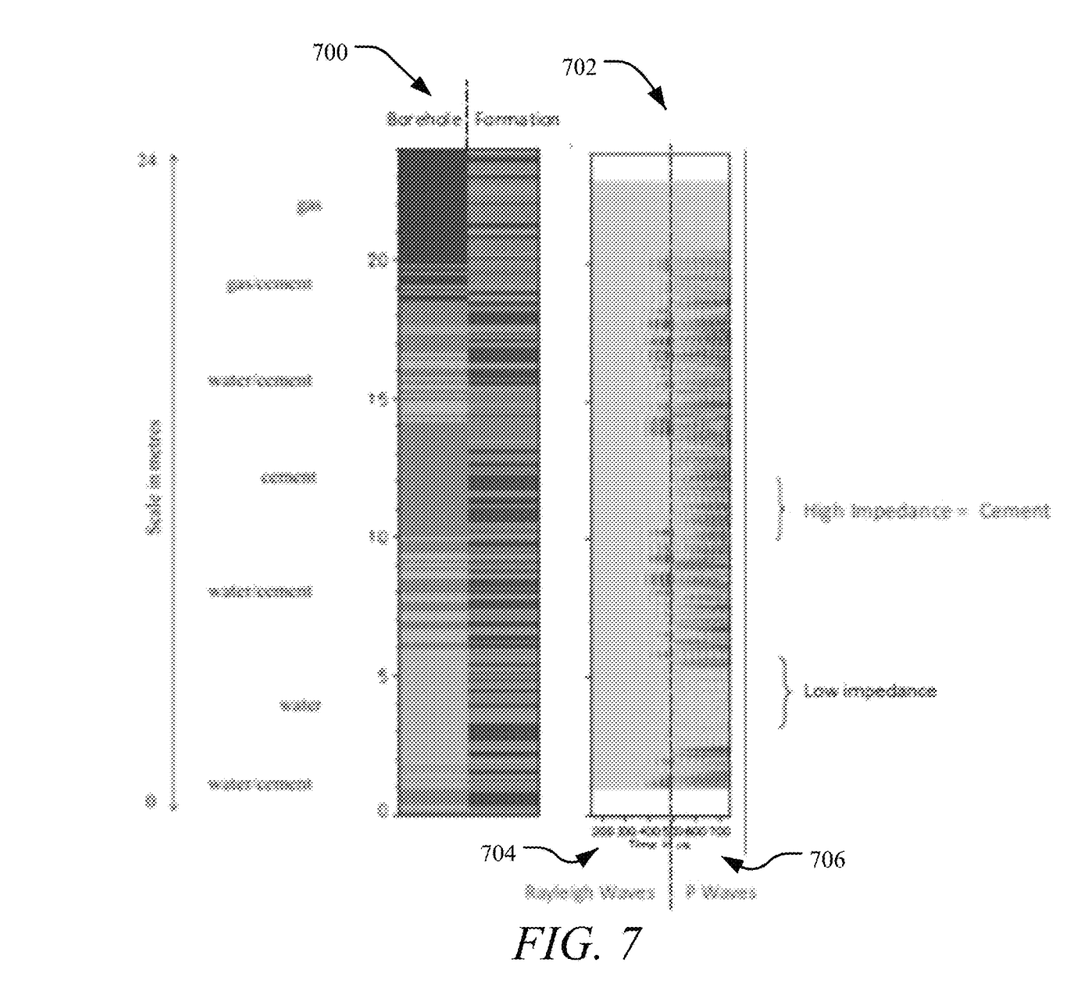
FIG. 7 illustrates separation of an axial log using velocity filtering.

Referring to FIG. 7, an axial log 702 generated for an example configuration 700 of the wellbore 106 within the formation 104 is illustrated. The axial log 700 can be separated into a first wave region 704 and a second wave region 706. The first wave region 704 may be a Rayleigh wave region, and the second wave region 706 may be a P wave region. In one implementation, the Rayleigh wave region can be defined as less than 500 µs (microseconds) while the P wave region can be defined as greater than 500 µs (microseconds). The P wave region can contain information about the faster traveling, higher penetration waves that have propagated into the subterranean formation 104.

The P wave region of the axial log 702 illustrates returns greater than 500 µs (microseconds) is a function of the acoustic impedance of what is present in an isolation region. Cement, having a comparatively high acoustic impedance, supports P waves traveling to and from the subterranean formation 104, thus allowing the axial log 702 and the P wave region to detail the presence of cement within the isolation region.

Specifically, the axial log 702 detailing no returns less than 500 µs (microseconds), while simultaneously detailing no returns greater than 500 µs (microseconds) corresponds to a presence of gas and/or liquid within the isolation region. The axial log 702 detailing no returns less than 500 µs (microseconds), while simultaneously detailing returns greater than 500 µs (microseconds) corresponds to a presence of cement within the isolation region due to a higher acoustic impedance of the cement 114 and support for P waves to travel to and return from the formation 104. Thus, an isolation region having cement can be detected through the use of the axial log 702, and specifically the P wave region.

Figure 8:
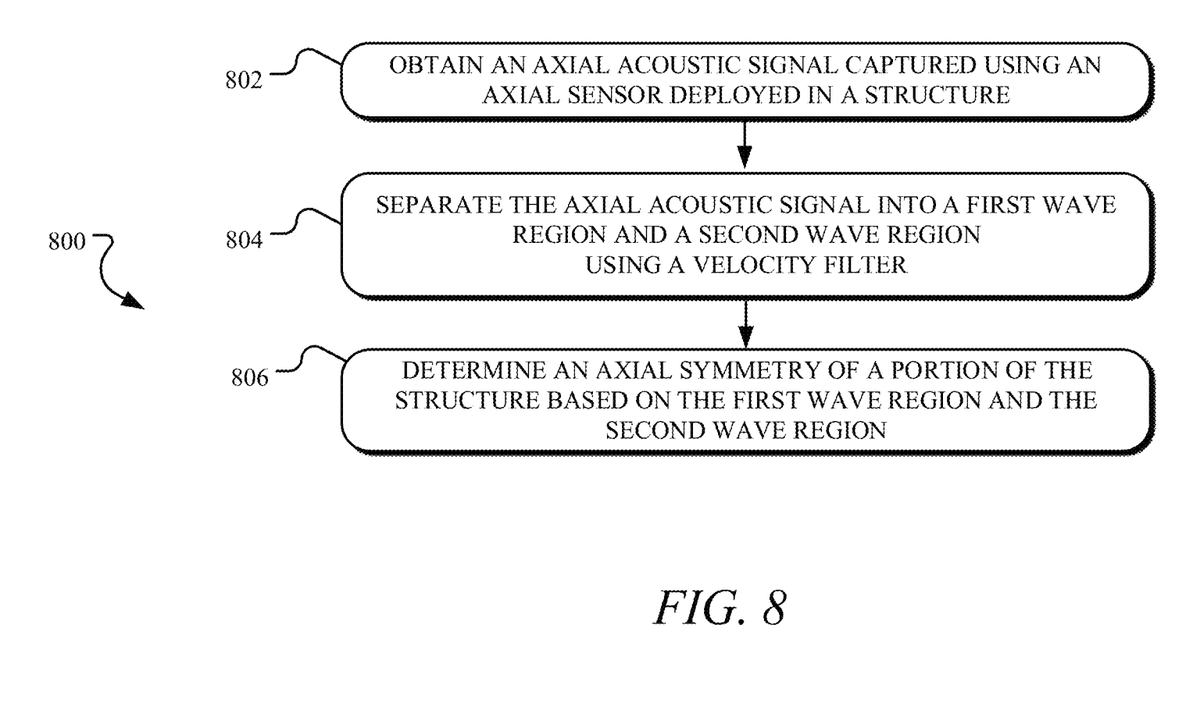
FIG. 8 illustrates example operations for analyzing a subterranean structure.

FIG. 8 illustrates example operations 800 for analyzing a subterranean structure. In one implementation, an operation 802 obtains an axial acoustic signal captured using an axial sensor deployed in a structure of a subterranean surface. An operation 804 separates the axial acoustic signal into a first wave region and a second wave region using a velocity filter. An operation 806 determines an axial symmetry of a portion of the structure based on the first wave region and the second wave region.

Figure 9:
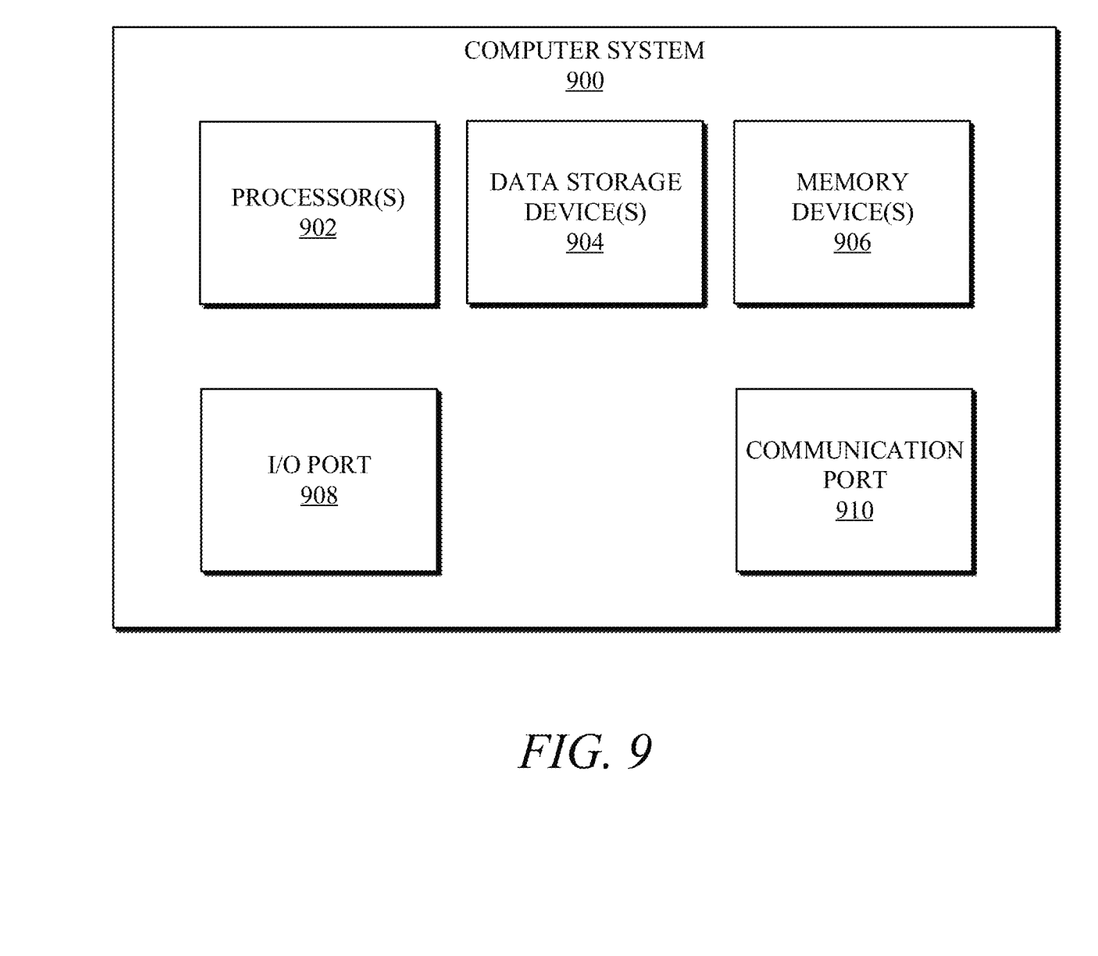
FIG. 9 depicts an example computing system that may implement various systems and methods discussed herein.

Referring to FIG. 9, a detailed description of an example computing system 900 having one or more computing units that may implement various systems and methods discussed herein is provided. The computing system 900 may be applied to the controller 202, data recorder, and/or the like and may be used in connection with processing, as described herein. It will be appreciated that specific implementations of these devices may be of differing possible specific computing architectures not all of which are specifically discussed herein but will be understood by those of ordinary skill in the art.

The computer system 900 may be a computing system is capable of executing a computer program product to execute a computer process. Data and program files may be input to the computer system 900, which reads the files and executes the programs therein. Some of the elements of the computer system 900 are shown in FIG. 9, including one or more hardware processors 902, one or more data storage devices 904, one or more memory devices 908, and/or one or more ports 908-910. Additionally, other elements that will be recognized by those skilled in the art may be included in the computing system 900 but are not explicitly depicted in FIG. 9 or discussed further herein. Various elements of the computer system 900 may communicate with one another by way of one or more communication buses, point-to-point communication paths, or other communication means not explicitly depicted in FIG. 9.

The processor 902 may include, for example, a central processing unit (CPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The computer system 900 may be a conventional computer, a distributed computer, or any other type of computer, such as one or more external computers made available via a cloud computing architecture. The presently described technology is optionally implemented in software stored on the data stored device(s) 904, stored on the memory device(s) 906, and/or communicated via one or more of the ports 908-910, thereby transforming the computer system 900 in FIG. 9 to a special purpose machine for implementing the operations described herein. Examples of the computer system 900 include personal computers, terminals, workstations, mobile phones, tablets, laptops, personal computers, multimedia consoles, gaming consoles, set top boxes, and the like.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 906 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908 and a communication port 910, for communicating with other computing, network, or vehicle devices. It will be appreciated that the ports 908-910 may be combined or separate and that more or fewer ports may be included in the computer system 900.

The I/O port 908 may be connected to an I/O device, or other device, by which information is input to or output from the computing system 900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. Similarly, the output devices may convert electrical signals received from computing system 900 via the I/O port 908 into signals that may be sensed as output by a human, such as sound, light, and/or touch. The input device may be an alphanumeric input device, including alphanumeric and other keys for communicating information and/or command selections to the processor 902 via the I/O port 908. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 900, such as, physical movement of some object (e.g., a mechanical actuator), heating or cooling of a substance, adding a chemical substance, and/or the like.

In one implementation, a communication port 910 is connected to a network by way of which the computer system 900 may receive network data useful in executing the methods and systems set out herein as well as transmitting information and network configuration changes determined thereby. Stated differently, the communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate one or more other machines, either directly over a point-to-point communication path, over a wide area network (WAN) (e.g., the Internet), over a local area network (LAN), over a cellular (e.g., third generation (3G), fourth generation (4G), or fifth generation (5G)) network, or over another communication means. Further, the communication port 910 may communicate with an antenna or other link for electromagnetic signal transmission and/or reception.

In an example implementation, radial logs, axial logs, impedance information, spectra, characterizations, and software and other modules and services may be embodied by instructions stored on the data storage devices 904 and/or the memory devices 906 and executed by the processor 902.

The system set forth in FIG. 9 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for isolation detection in a wellbore, the method comprising:
   obtaining an axial acoustic signal, the axial acoustic signal captured using an axial sensor deployed in a structure in a subterranean surface;
   determining one or more velocities of one or more waveforms included in the axial acoustic signal;
   separating the axial acoustic signal into a first wave region and a second wave region by applying velocity filtering to the one or more velocities;
   generating an axial log indicating an axial symmetry of a portion of the structure based on at least one of the first wave region or the second wave region;
   generating a radial log indicating a radial symmetry of the portion of the structure based on a radial acoustic signal; and
   combining the axial log and the radial log to generate an isolation characterization for the portion of the structure.

2. The method of claim 1, wherein the first wave region corresponds to a first propagation mode and the second wave region corresponds to a second propagation mode, the first propagation mode being different than the second propagation mode.

3. The method of claim 2, wherein the first propagation mode includes Rayleigh waves and the second propagation mode includes P waves.

4. The method of claim 2, wherein the first propagation mode corresponds to a first velocity and the second propagation mode corresponds to a second velocity.

5. The method of claim 2, wherein the first propagation mode corresponds to a first penetration and the second propagation mode corresponds to a second penetration.

6. The method of claim 5, wherein the first penetration is lower than the second penetration.

7. The method of claim 1, wherein at least one isolation region corresponding to the portion of the structure is detected based on the axial symmetry.

8. The method of claim 1, wherein an axial log is generated based on the axial acoustic signal, and the velocity filtering separates the axial log into the first wave region and the second wave region.

9. The method of claim 1, wherein the first wave region corresponds to return signals of the axial acoustic signal receives below than a threshold and the second wave region corresponds to return signals of the axial acoustic signal received over the threshold.

10. The method of claim 9, wherein the threshold is 500 microseconds.

11. The method of claim 1, wherein a presence of cement at the portion of the structure is determined using the second wave region.

12. The method of claim 1, wherein the axial symmetry includes an absence of returns corresponding to the first wave region and a presence of returns corresponding to the second wave region.

13. A method for isolation detection in a wellbore, the method comprising:
   obtaining an axial acoustic signal, the axial acoustic signal captured using an axial sensor deployed in a structure in a subterranean surface;
   determining a first velocity of a first waveform included in the axial acoustic signal, and a second velocity of a second waveform included in the axial acoustic signal;
   separating the axial acoustic signal into a first wave region and a second wave region by applying velocity filtering to the first velocity and the second velocity;
   determining an axial symmetry of a portion of the structure based on at least one of the first wave region or the second wave region;
   determining a radial symmetry of the portion of the structure based on at least a radial acoustic signal; and
   generating an isolation characterization for the portion of the structure based on both the axial symmetry and the radial symmetry.

14. One or more tangible non-transitory computer-readable storage media storing computer-executable instructions for performing a computer process on a computing system, the computer process comprising:
   obtaining an axial acoustic signal using an axial sensor deployed in a structure in a subterranean surface;
   obtaining a radial acoustic signal using a radial sensor deployed in the structure;
   determining one or more velocities of one or more waveforms included in the axial acoustic signal;
   separating the axial acoustic signal into a first wave region and a second wave region by applying velocity filtering to the one or more velocities; and
   generating an axial log indicating an axial symmetry of a portion of the structure based on at least one of the first wave region or the second wave region;
   generating a radial log indicating a radial symmetry of the portion of the structure based at least partly on the radial acoustic signal;
   determining if the portion of the structure is axially or radially homogenous by combining the axial log with the radial log.

15. The one or more tangible non-transitory computer-readable storage media of claim 14, wherein the first wave region corresponds to a first propagation mode and the second wave region corresponds to a second propagation mode, the first propagation mode being different than the second propagation mode.

16. The one or more tangible non-transitory computer-readable storage media of claim 15, wherein the first propagation mode includes Rayleigh waves and the second propagation mode includes P waves.

17. The one or more tangible non-transitory computer-readable storage media of claim 15, wherein the first propagation mode corresponds to a first velocity and the second propagation mode corresponds to a second velocity.

18. The one or more tangible non-transitory computer-readable storage media of claim 17, wherein the first velocity is slower than the second velocity.

19. The one or more tangible non-transitory computer-readable storage media of claim 15, wherein the first wave region corresponds to return signals of the axial acoustic signal receives below than a threshold and the second wave region corresponds to return signals of the axial acoustic signal received over the threshold.

20. The one or more tangible non-transitory computer-readable storage media of claim 15, wherein the axial symmetry includes an absence of returns corresponding to the first wave region and a presence of returns corresponding to the second wave region.

* * * * *